United States Patent
Ishizeki et al.

(10) Patent No.: US 9,577,534 B2
(45) Date of Patent: Feb. 21, 2017

(54) POWER CONVERTER AND AIR CONDITIONER

(71) Applicant: DAIKIN INDUSTRIES, LTD., Osaka-shi, Osaka (JP)

(72) Inventors: Shinichi Ishizeki, Osaka (JP); Kentarou Taoka, Osaka (JP); Masahide Fujiwara, Osaka (JP); Motonobu Ikeda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/026,285

(22) PCT Filed: Aug. 27, 2014

(86) PCT No.: PCT/JP2014/004395
§ 371 (c)(1),
(2) Date: Mar. 31, 2016

(87) PCT Pub. No.: WO2015/056389
PCT Pub. Date: Apr. 23, 2015

(65) Prior Publication Data
US 2016/0218624 A1  Jul. 28, 2016

(30) Foreign Application Priority Data

Oct. 16, 2013  (JP) .................................. 2013-215242

(51) Int. Cl.
*H02M 1/42* (2007.01)
*H02M 3/26* (2006.01)
(Continued)

(52) U.S. Cl.
CPC ................ *H02M 3/26* (2013.01); *H02M 1/32* (2013.01); *H02M 1/36* (2013.01); *H02M 1/42* (2013.01);
(Continued)

(58) Field of Classification Search
CPC ........... H02M 3/26; H02M 1/42; H02M 1/32; H02M 1/36; H02M 1/4225; H02M 3/157; H02M 2003/1586; F25B 49/025; F25B 2700/21152; F25B 2700/21163; F25B 2700/21151; F25B 2600/021; F24F 2011/0083; Y02B 70/126
See application file for complete search history.

(56) References Cited

U.S. PATENT DOCUMENTS 4,816,985 A * 3/1989 Tanahashi ........... H02M 5/4585
363/37
5,504,667 A * 4/1996 Tanaka ................ H02M 5/4505
363/37
(Continued)

FOREIGN PATENT DOCUMENTS

CN          1589519 A       3/2005
JP        2003-79050 A      3/2003
(Continued)

*Primary Examiner* — Allana Lewin Bidder
*Assistant Examiner* — Kun Kai Ma
(74) *Attorney, Agent, or Firm* — Birch, Stewart, Kolasch & Birch, LLP

(57) ABSTRACT

Malfunctions of a switching device included in a power factor corrector are reduced when an instantaneous voltage drop or an instantaneous power failure occurs. If the instantaneous voltage drop or the instantaneous power failure occurs in an AC power source while the power factor corrector is performing a power factor correction operation by boosting an input voltage, an instantaneous power failure controller turns off the switching device included in the power factor corrector so that the power factor correction operation stops. When the commercial power source recovers, too, the power factor corrector suspends the power factor correction operation.

12 Claims, 9 Drawing Sheets

(51) Int. Cl.
  *H02M 1/32*    (2007.01)
  *H02M 1/36*    (2007.01)
  H02M 3/157    (2006.01)
  H02M 3/158    (2006.01)
  F24F 11/00    (2006.01)

(52) U.S. Cl.
  CPC ..... *H02M 1/4225* (2013.01); *F24F 2011/0083* (2013.01); *H02M 3/157* (2013.01); *H02M 2003/1586* (2013.01); *Y02B 70/126* (2013.01)

(56) References Cited

U.S. PATENT DOCUMENTS

| | | | | |
|---|---|---|---|---|
| 6,137,700 A * | 10/2000 | Iida | .................... | H02M 1/4208 323/282 |
| 6,244,061 B1 * | 6/2001 | Takagi | .................. | F25B 49/025 62/228.4 |
| 6,320,772 B1 * | 11/2001 | Doyama | ............. | H02M 1/4208 363/127 |
| 8,076,920 B1 * | 12/2011 | Melanson | ........... | H02M 1/4208 315/247 |
| 8,498,136 B2 * | 7/2013 | Shinomoto | ......... | H02M 1/4208 363/125 |
| 8,508,165 B2 * | 8/2013 | Shinomoto | ........... | H02M 1/126 318/375 |
| 2005/0068001 A1 * | 3/2005 | Skaug | .................... | F04C 28/08 318/807 |
| 2009/0243525 A1 * | 10/2009 | Ikeda | .................... | H02P 29/032 318/400.22 |
| 2009/0303751 A1 * | 12/2009 | Usui | ................... | H02M 1/4225 363/15 |
| 2010/0302700 A1 * | 12/2010 | Kellis | ................. | H02H 3/0935 361/109 |
| 2011/0025242 A1 * | 2/2011 | Maeda | ...................... | H02P 6/16 318/400.04 |
| 2011/0031911 A1 * | 2/2011 | Marcinkiewicz | ... | H02M 1/4225 318/400.3 |
| 2011/0164339 A1 * | 7/2011 | Schmid | ............... | H02M 1/4208 361/18 |
| 2012/0126776 A1 * | 5/2012 | Kagimura | ............. | H02M 5/458 323/304 |
| 2012/0286708 A1 * | 11/2012 | Ikeda | .................... | H02M 7/062 318/400.3 |

FOREIGN PATENT DOCUMENTS

| | | |
|---|---|---|
| JP | 2004-64904 A | 2/2004 |
| JP | 2010-11533 A | 1/2010 |
| JP | 2011-239547 A | 11/2011 |
| JP | 2012-226917 A | 11/2012 |

* cited by examiner

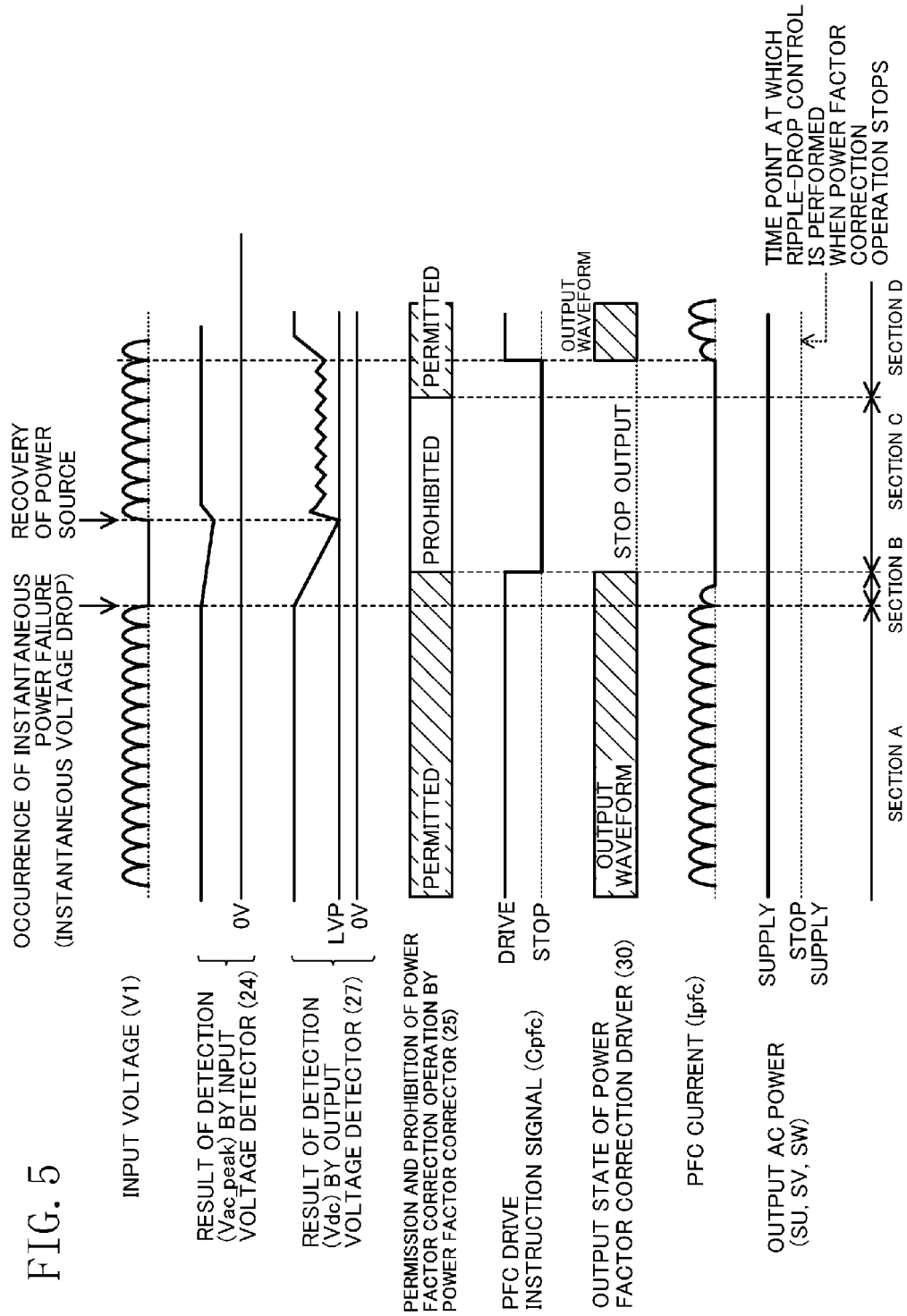

| RECORD NUMBER | OPERATION NAME (Ta11) | OPERATION CONDITION (Ta12) | OPERATION DETAILS (Ta13) |
|---|---|---|---|
| 1 | DETECT INSTANTANEOUS POWER INTERFERENCE | • DIF < Vdc_ref−Vdc<br>• Vdc > LVP<br>• PREDETERMINED PERIOD AT INPUT > PREDETERMINED PERIOD AT OUTPUT (TO Vac_peak) (TO Vdc) | • STOP POWER FACTOR CORRECTION OPERATION<br>• LEAVE COMPRESSOR (72) TO CONTINUE DRIVING |
| 2 | VOLTAGE ABNORMALITY | Vdc < LVP | • OPEN MAIN POWER SOURCE RELAY (23)<br>• STOP OUTPUTTING OUTPUT AC POWER (SU, SV, SW)<br>• PRESENT MESSAGE INDICATING ABNORMALITY OF OUTPUT VOLTAGE (V2) |
| 3 | DETECT POWER SOURCE RECOVERY | • Vdc > LVP<br>• 100 MSEC HAVE PASSED SINCE OCCURRENCE OF INSTANTANEOUS POWER INTERFERENCE | • MONITOR DRIVE OF COMPRESSOR (72)<br>• START COUNTING DRIVING TIME OF COMPRESSOR (72) |
| 4 | SWITCH TO RECOVERY OF POWER FACTOR CORRECTION OPERATION | DRIVING TIME OF COMPRESSOR (72) HAS REACHED PREDETERMINED TIME PERIOD | SWITCH POWER FACTOR CORRECTION OPERATION FROM "PROHIBITED" TO "PERMITTED" |

POWER CONVERTER AND AIR CONDITIONER

TECHNICAL FIELD

The present invention relates to a power converter and, in particular, to a technique for reducing malfunctions of a switching device included in a power factor corrector. The present invention further relates to reduction in size and cost of the switching device. Moreover, the present invention relates to an air conditioner including the power converter.

BACKGROUND ART

Compressors in air conditioners are powered by a motor working as a drive source. The motor is driven by alternating-current (AC) power supplied from a power converter.

A typical power converter mainly includes a rectifier, a boost power factor corrector, and an inverter power converter, as disclosed in Patent Document 1. First, the rectifier rectifies an AC commercial voltage output from a commercial power source. The rectified voltage is boosted to a desired voltage and smoothed by the power factor corrector, so that the power factor of the voltage is corrected to improve. The voltage with the power factor corrected is supplied to the power converter. Using the voltage with the power factor corrected, the power converter generates AC power for driving the motor.

CITATION LIST

Patent Document

PATENT DOCUMENT 1: Japanese Unexamined Patent Publication No. 2011-239547

SUMMARY OF THE INVENTION

Technical Problem

When an instantaneous voltage drop or an instantaneous power failure occurs in the commercial power source while the power factor corrector is operating, the output voltage from the power factor corrector decreases. However, the instantaneous voltage drop and the instantaneous power failure last for a very short period, such that the commercial power source recovers, for example, in 10 msec to 100 msec after the drop and failure start to occur. Hence, immediately after the recovery of the commercial power source, the power factor corrector performs a power factor correction operation before the output voltage from the power factor corrector itself reaches a defined output voltage value. The power factor corrector then tries to boost the output voltage to the defined output voltage value. As a result, the output voltage from the power factor corrector instantaneously surges, causing a flow of an excessive amount of current in a switching device included in the power factor corrector. This might cause a malfunction of the switching device.

In view of the foregoing background, it is therefore an object of the present invention to reduce malfunctions of a switching device, included in a power factor corrector, at the occurrence of an instantaneous voltage drop or an instantaneous power failure.

Solution to the Problem

A first aspect of the present disclosure comprises a rectifier (22) configured to rectify an input alternate current (AC) from an AC power source (91); a power factor corrector (25) including a reactor (L25a, L25b, L25c) and a switching device (Q25a, Q25b, Q25c) which switches between accumulation and discharge of energy, based on an input voltage (V1) output from the rectifier (22), in and out of the reactor (L25a, L25b, L25c), and configured to be capable of performing a power factor correction operation by boosting the input voltage (V1); a power converter (28) connected to an output of the power factor corrector (25), and configured to generate output AC power (SU, SV, SW); and a controller (31g) configured to control the power factor correction operation by the power factor corrector (25). The controller (31g) is configured to: turn the switching device (Q25a, Q25b, Q25c) off so that the power factor correction operation stops, if an instantaneous voltage drop or an instantaneous power failure occurs in the AC power source (91) while the power factor corrector (25) is performing the power factor correction operation; and leave the power factor correction operation stopped when the AC power source (91) recovers.

According to the first aspect of the present disclosure, the switching device (Q25a, Q25b, Q25c) of the boost power factor corrector (25) turns off when an instantaneous power failure or an instantaneous voltage drop occurs, so that the power factor correction operation—the boosting operation—stops. When the commercial power source (91) recovers, too, the power factor correction operation is suspended. Hence, in the power factor corrector (25), the current path including the switching device (Q25a, Q25b, Q25c) is cut off. The cut-off of the current path limits a temporal surge of the output voltage (V2), from the power factor corrector (25), due to the power factor correction operation performed when the commercial power source (91) recovers, and reduces an excessive amount of current flowing in the switching device (Q25a, Q25b, Q25c). Such features enable curbing malfunctions of the switching device (Q25a, Q25b, Q25c), contributing to reduction of the switching device (Q25a, Q25b, Q25c) in size and cost.

In the first aspect, a second aspect of the present disclosure may further comprise an output voltage detector (27) configured to detect an output voltage (V2) from the power factor corrector (25). The controller (31g) may be configured to determine the occurrence of the instantaneous voltage drop or the instantaneous power failure if a difference between (i) a target value (Vdc_ref) of the output voltage to be output by the power factor corrector (25) and (ii) a result of the detection (Vdc) by the output voltage detector (27) is greater than a predetermined difference (DIF).

According to the second aspect of the present disclosure, whether the instantaneous voltage drop or the instantaneous power failure has occurred is easily determined, based on the difference between the target value (Vdc_ref) of the output voltage and the result of the detection (Vdc) by the output voltage detector (27).

In the second aspect, a third aspect of the present disclosure may further comprise an input voltage detector (24) configured to detect the input voltage (V1). The controller (31g) is configured to determine the target value (Vdc_ref) of the output voltage (V2), based on a result of detection (Vac_peak) by the input voltage detector (24). A detection period of the input voltage detector (24) is longer than a detection period of the output voltage detector (27).

When the instantaneous voltage drop or the instantaneous power failure occurs, both the actual input voltage (V1) and output voltage (V2) decrease. In the third aspect, meanwhile, the detection period of the input voltage detector (24) is longer than the detection period of the output voltage detector (27). Thus, the occurrence of the instantaneous voltage drop or the instantaneous power failure raises the result of detection (Vac_peak) by the input voltage detector (24) higher in value than the result of the detection (Vdc) by the output voltage detector (27). Accordingly, the difference between the result of the detection (Vdc) by the output voltage detector (27) and the target value (Vdc_ref) of the output voltage determined based on the result of detection (Vac_peak) by the input voltage detector (24) is greater than the predetermined difference (DIF). Consequently, the controller (31g) may reliably determine the instantaneous voltage drop or the instantaneous power failure even though the target value (Vdc_ref) of the output voltage is varied based on the result of detection (Vac_peak) by the input voltage detector (24).

In the third aspect, the input voltage detector (24) in a fourth aspect of the present disclosure may be configured to sample a peak amplitude (V11) of the input voltage (V1), and determine the sampled peak amplitude (V11) as the result of detection (Vac_peak).

In the first aspect, a fifth aspect of the present disclosure may further comprise a n input voltage detector (24) configured to detect the input voltage (V1). The controller (31g) may be configured to determine whether the instantaneous voltage drop or the instantaneous power failure has occurred, depending on how large or small the result of detection (Vac_peak) by the input voltage detector (24) is.

Because of these features, the result of detection (Vac_peak) by the input voltage detector (24) becomes smaller as soon as, for example, the instantaneous voltage drop occurs, which contributes to easy determination of the instantaneous voltage drop or the instantaneous power failure.

A sixth aspect of the present disclosure provides an air conditioner including the power converter (20) of any one of the first to the fifth aspects.

In the sixth aspect, a seventh aspect of the present disclosure may further comprise a compressor (72) configured to compress a refrigerant. The switching device (Q25a, Q25b, Q25c) and the power converter (28) are connected in parallel to the reactor (L25a, L25b, L25c), and the controller (31g) is configured to leave the compressor (72) driving without rest, if the instantaneous voltage drop or the instantaneous power failure occurs while the compressor (72) is driving.

Such a feature allows a user to stay comfortable in a room air-conditioned by the air conditioner (70).

In the seventh aspect, the controller (31g) in an eighth aspect of the present disclosure may be configured to leave the compressor (72) driving without rest, if the instantaneous voltage drop or the instantaneous power failure occurs while the compressor (72) is driving.

Such a feature allows the power factor corrector (25) to resume the power factor correction operation when the compressor (72) is driving normally.

In the eighth aspect, the power factor corrector (25) in a ninth aspect of the present disclosure may further include a smoothing capacitor (26) provided close to an output of the reactor (L25a, L25b, L25c), and connected in parallel to the switching device (Q25a, Q25b, Q25c). The predetermined time period is shorter than a time interval from the recovery of the AC power source (91) to a start of control to drop a ripple component of a voltage across the smoothing capacitor (26).

In the ninth aspect of the present disclosure, the power factor corrector (25) is permitted to perform power factor correction operation between the recovery of the AC power source (91) and the start of the ripple-component drop control. Such a feature minimizes a decline in performance, of the air conditioner (70), due to the ripple-drop control.

In any one of the sixth to eighth aspect, the power factor corrector (25) in a tenth aspect of the present disclosure may further include a smoothing capacitor (26) provided close to an output of the reactor (L25a, L25b, L25c), and connected in parallel to the switching device (Q25a, Q25b, Q25c). The controller (31g) may be configured to cause the power factor correction operation to stop and the ripple component of the voltage across the smoothing capacitor (26) to drop, if the instantaneous voltage drop or the instantaneous power failure occurs while the compressor (72) is driving under overload.

If the compressor (72) is under overload when the power factor correction operation stops due to the occurrence of the instantaneous voltage drop or the instantaneous power failure, an excessive amount of current inevitably flows into, for example, the rectifier (22), accompanied by a lowering power factor due to the stop of the power factor correction operation. In the tenth aspect of the present disclosure, however, the ripple-component drop control is performed in addition to the stop of the power factor correction operation, if the instantaneous voltage drop or the instantaneous power failure occurs when the compressor (72) is under overload. Such a feature limits the performance of the compressor (72) even though the power factor correction operation stops, which contributes to curbing the flow of the excessive amount of current into, for example, the rectifier (22).

Advantages of the Invention

The first and sixth aspects enable curbing malfunctions of the switching device (Q25a, Q25b, Q25c), contributing to reduction of the switching device (Q25a, Q25b, Q25c) in size and cost.

The second and fifth aspects enable easily determining whether the instantaneous voltage drop or the instantaneous power failure has occurred.

The third and fourth aspects allow the controller (31g) to reliably determine the instantaneous voltage drop or the instantaneous power failure even though the target value (Vdc_ref) of the output voltage is varied based on the result of detection (Vac_peak) by the input voltage detector (24).

The seventh aspect allows a user to stay comfortable in a room air-conditioned by the air conditioner (70).

The eighth aspect allows the power factor corrector (25) to resume the power factor correction operation when the compressor (72) is driving normally.

The ninth aspect enables minimizing a decline in performance, of the air conditioner (70), due to the ripple-drop control.

The tenth aspect enables curbing a flow of the excessive amount of current into, for example, the rectifier (22).

BRIEF DESCRIPTION OF THE DRAWINGS

FIG. 5 is a timing diagram illustrating temporal changes in: input voltage; results of detection by an input voltage detector and an output voltage detector; permission and prohibition of a power factor correction operation by a power factor corrector; PFC drive instruction signal; output state of a power factor correction driver; PFC current; and output AC power.

FIG. 6 is a condition table organizing details of controls to be carried out mainly by an instantaneous power failure controller.

DESCRIPTION OF EMBODIMENTS

Described hereinafter are embodiments of the present invention, with reference to the drawings. Note that the embodiments are essentially preferable examples, and are not intended to limit the scopes of the present invention, of the application of the present invention, or of the use of the present invention.

First Embodiment

Outline

Figure 1:
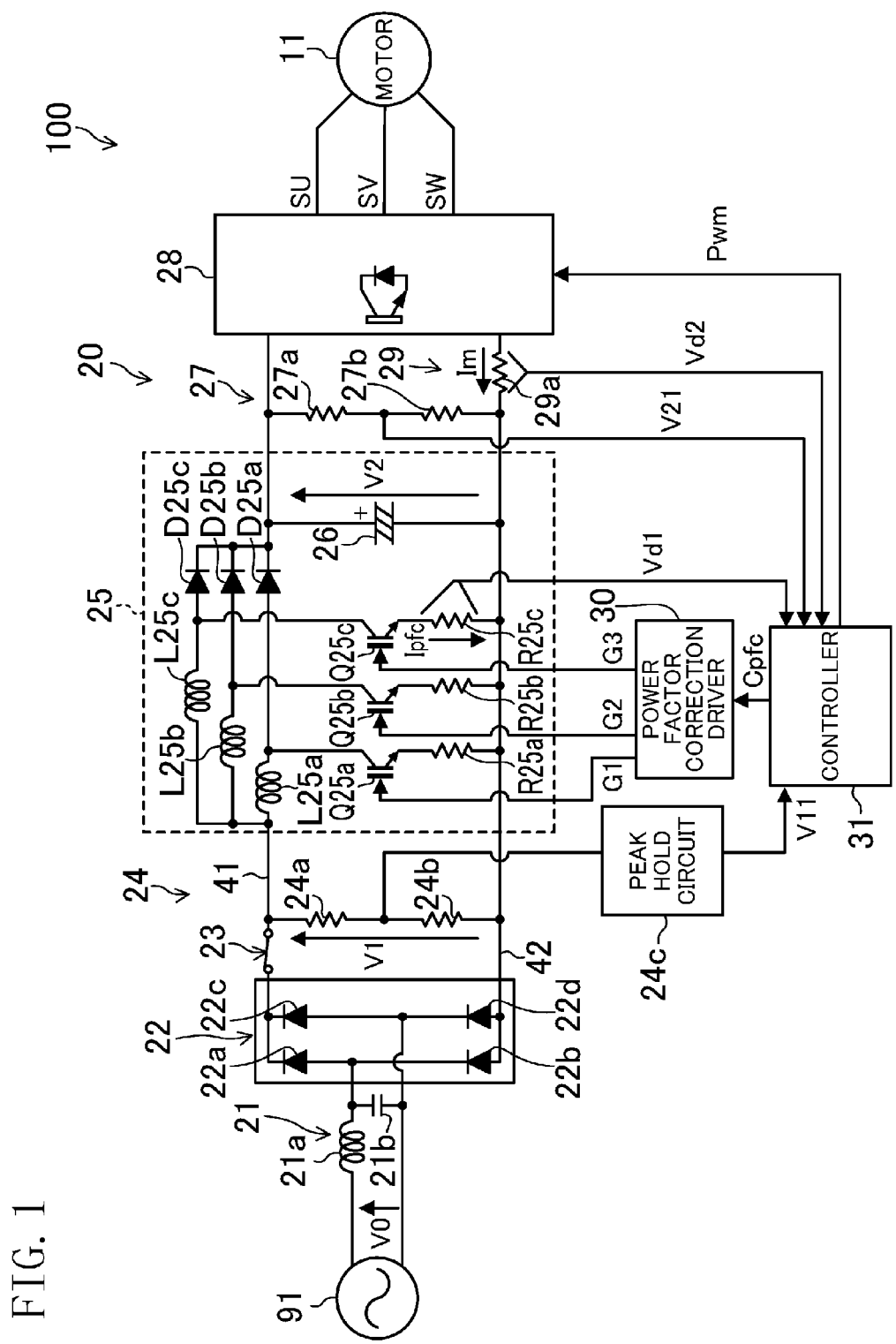
FIG. 1 is a block diagram of a motor driving system including a power converter.

FIG. 1 is a block diagram of a motor driving system (100) including a power converter (20) according to the first embodiment. The motor driving system (100) of FIG. 1 includes a motor (11) and the power converter (20).

The motor (11) is a three-phase brushless DC motor. Although not shown, the motor (11) includes, for example, a stator, a rotor, and a hall effect sensor. The stator includes multiple drive coils. The rotor includes a permanent magnet. The hall effect sensor is used to detect a position of the rotor with respect to the stator.

Figure 9:
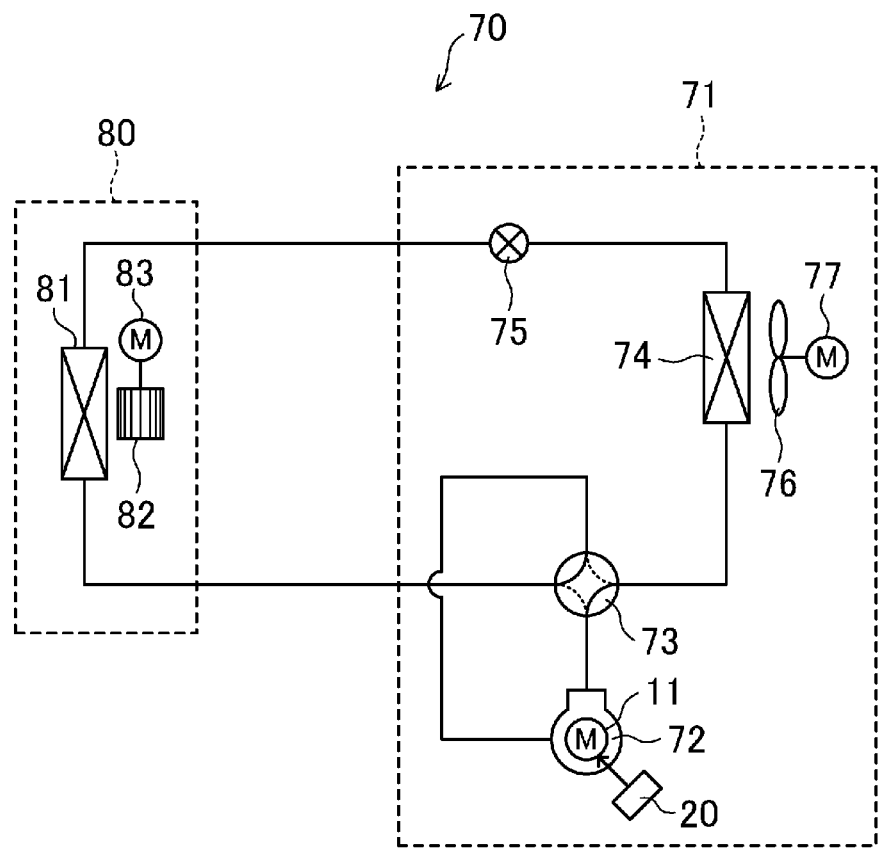
FIG. 9 is a general diagram illustrating a configuration of an air conditioner.

Note that the motor (11) according to this first embodiment is a drive source for a compressor (72) included in an air conditioner (70) in FIG. 9. FIG. 9 is a general diagram illustrating a configuration of the air conditioner (70). As illustrated in FIG. 9, an outdoor unit (71) includes the compressor (72) that compresses a refrigerant, and the motor (11). The outdoor unit (71) further includes: a four-way switching valve (73) which switches a flow of the refrigerant; an outdoor heat exchanger (74) which exchanges heat between the refrigerant and outdoor air; an expansion valve (75) which decompresses the refrigerant; an outdoor fan (76) which supplies the outdoor air to the outdoor heat exchanger (74), and a fan motor (77). An indoor unit (80) includes: an indoor heat exchanger (81) which exchanges heat between the refrigerant and indoor air; an indoor fan (82) which blows the air after the heat exchange into the room; and a fan motor (83).

The power converter (20) is connected to the motor (11) and a commercial power source (91) via multiple harnesses. The power converter (20) converts input AC power, provided from the commercial power source (91), into output AC power (SU, SV, SW), and supplies the converted output AC power to the motor (11). Here, the commercial power source (91) is an AC power source. Such features enable the motor (11) to run.

Note that the first embodiment presents, as an example, a case where the commercial power source (91) is a single-phase power source.

Configuration of Power Converter

The power converter (20) mainly includes: a filter (21); a rectifier (22); a main power source relay (23); an input voltage detector (24); a power factor corrector (25); an output voltage detector (27); a power converter (28); a current detector (29); a power factor correction driver (30); and a controller (31).

—Filter—

The filter (21) is located between the commercial power source (91) and the rectifier (22). The filter (21) is a low-pass filter including a coil (21*a*) and a capacitor (21*b*), and reduces high-frequency noise, generated by the power factor corrector (25) and the power converter (28), accidentally entering the commercial power source (91).

—Rectifier—

The rectifier (22) is connected to a stage subsequent to the filter (21). The rectifier (22) includes four diodes (22*a*, 22*b*, 22*c*, 22*d*).

Specifically, cathode terminals of the diodes (22*a* 22*c*) are connected to a power source line (41). Anode terminals of the diodes (22*b*, 22*d*) are connected to a GND line (42). A connecting point between the anode terminal of the diode (22*a*) and the cathode terminal of the diode (22*b*) and another connecting point between the anode terminal of the diode (22*c*) and the cathode terminal of the diode (22*d*) are each connected to a different one of outputs of the commercial power source (91).

Figure 2:
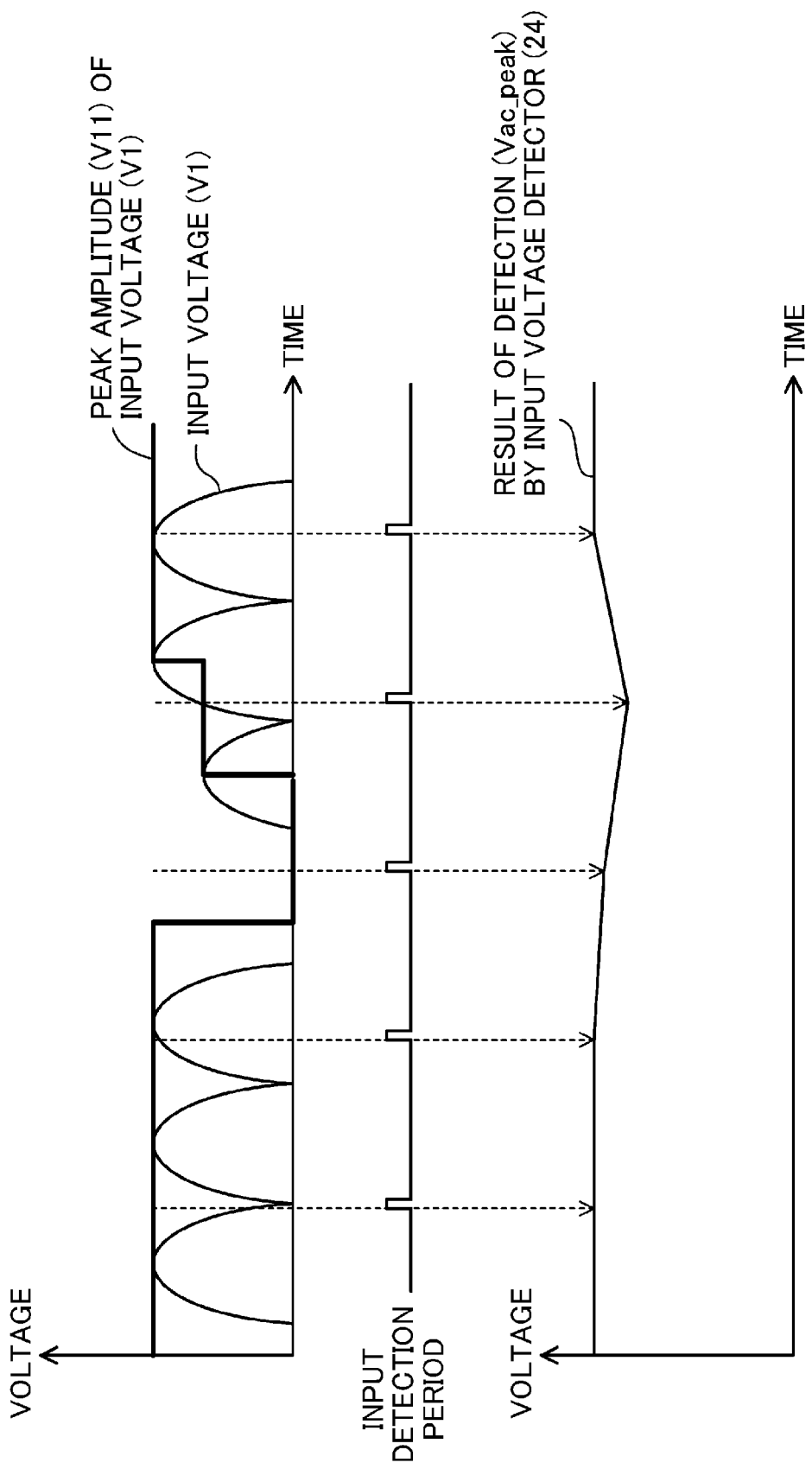
FIG. 2 is a timing diagram illustrating temporal changes in: input voltage; peak amplitude of the input voltage; input detection period; and result of detection by an input voltage detector.

As illustrated in FIG. 2, the rectifier (22) performs full-wave rectification on an input AC from the commercial power source (91), and outputs the rectified input AC. FIG. 2 illustrates temporal changes in: rectified voltage (i.e., an input voltage) (V1); peak amplitude (V11) of the input voltage (V1); input detection period to be discussed later; and result of detection (Vac_peak) by the input voltage detector (24).

For the sake of description, the voltage of the input AC is hereinafter referred to as a "commercial voltage (V0)".

—Main Power Source Relay—

The main power source relay (23) is connected in series, on the power source line (41), between the rectifier (22) and the power factor corrector (25). The main power source relay (23) is a normally closed contact. The main power source relay (23) is opened to shut down the supply of power from the commercial power source (91) to the motor (11), in the case where, for example, the motor (11) has to stop driving urgently.

Examples of such a case include the cases where the compressor (72) generates abnormally high pressure and the motor (11) receives an excessively large amount of current.

Note that the main power source relay (23) may be positioned at a stage prior to the rectifier (22), instead of a stage subsequent to the rectifier (22).

—Input Voltage Detector—

The input voltage detector (24) detects the voltage (V1) output from the rectifier (22) as the input voltage to the power factor corrector (25).

Figure 3:
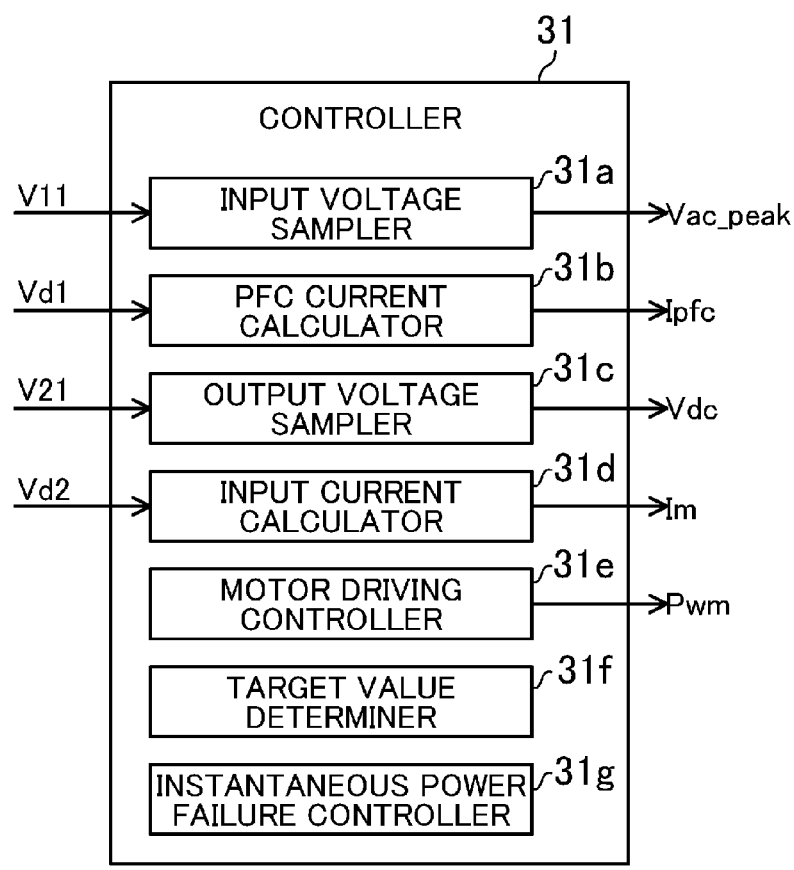
FIG. 3 is a schematic diagram illustrating functional units of a controller according to a first embodiment.

Specifically, as illustrated in FIGS. 1 and 3, the input voltage detector (24) mainly includes two resistors (24*a*, 24*b*) connected to each other in series, a peak hold circuit (24*c*), and the controller (31) functioning as an input voltage sampler (31*a*). The two resistors (24*a*, 24*b*) are provided between the main power source relay (23) and the power factor corrector (25), and connected across the outputs of the rectifier (22). A voltage value at the connecting point between the resistors (24a, 24b) is input into the peak hold circuit (24c). As illustrated in FIG. 2, the peak hold circuit (24c) holds a peak amplitude (V11), representing the maximum value of the input voltage (V1), for a certain period of time. This peak amplitude (V11) is input into the controller (31), sampled and converted from analogue to digital by the input voltage sampler (31a) for an input detection period as illustrated in FIG. 2, and identified by the input voltage detector (24) as the result of detection (Vac_peak).

Here, FIG. 3 schematically illustrates functional units of the controller (31) according to the first embodiment.

Moreover, FIG. 2 illustrates a case where an input detection period, representing a detection period of the input voltage detector (24), is longer than a period (i.e., power frequency) in which the input voltage (V1) reaches the maximum value.

—Power Factor Corrector—

As illustrated in FIG. 1, the power factor corrector (25) is connected through the main power source relay (23) to the outputs of the rectifier (22). The power factor corrector (25) is a boost power factor correction circuit, and performs a power factor correction operation by boosting and smoothing the input voltage (V1).

Specifically, the power factor corrector (25) according to the first embodiment includes a three-phase boost converter and a smoothing capacitor (26). Here, the boost converter is a three-phase interleaved converter. More specifically, the power factor corrector (25) includes three reactors (L25a, L25b, L25c), three switching devices (Q25a, Q25b, Q25c), three resistors (R25a, R25b, R25c), three diodes (D25a, D25b, D25c), and one smoothing capacitor (26).

The reactor (L25a) is connected in series on the power source line (41). Using the input voltage (V1) as electrical energy, the reactor (L25a) converts the input voltage (V1) into magnetic flux energy and stores the magnetic flux energy. An inductance value of the reactor (L25a) is appropriately determined based on, for example, a value of current flowing through the power source line (41), and a switching frequency of the switching device (Q25a).

The switching device (Q25a) is an n-ch insulated gate bipolar transistor, and connected in parallel to the reactor (L25a). The switching device (Q25a) switches between accumulation and discharge of the energy, based on the input voltage (V1), in and out of the reactor (L25a). The on and off of the switching device (Q25a) is controlled by the power factor correction driver (30).

The resistor (R25a) is a shunt resistor for detecting a PFC current (Ipfc) flowing through the switching device (Q25a), and connected between the switching device (Q25a) and the GND line (42). A voltage (Vd1) across the resistor (R25a) is converted from analogue to digital, and then input into the controller (31) functioning as a PFC current calculator (31b) as seen in FIG. 3. The voltage (Vd1) is used for calculating the PFC current (Ipfc). The PFC current (Ipfc) is used for controlling the drive of the power factor corrector (25). This is to supply stable energy to a stage subsequent to the power factor corrector (25) even if the output voltage (V2) fluctuates to some degree. A resistance of the resistor (R25a) is determined to be an appropriate value which does not hinder an operation by the power factor corrector (25) to boost a voltage.

Note that, in FIG. 1, the voltage (Vd1) across the resistor (R25c) alone is input into the controller (31). The voltages (Vd1) across the resistors (R25a, R25b) are also input into the controller (31).

The diode (D25a) is provided close to an output of the reactor (L25a), and connected in series on the power source line (41). Specifically, the diode (D25a) has an anode terminal provided more downstream in current flow direction than a connecting point between the reactor (L25a) and the switching device (Q25a). The diode (D25a) allows the current to flow only from the reactor (L25a) toward the power converter (28).

The smoothing capacitor (26) is, for example, an electrolytic capacitor. One smoothing capacitor (26) is provided in common to the boost converters for all the phases. The smoothing capacitor (26) is provided close to the outputs of the reactors (L25a, L25b, L25c), and connected in parallel to the switching devices (Q25a, Q25b, Q25c). The smoothing capacitor (26) generates a direct-current (DC) voltage having a relatively low ripple component, by charging itself with energy released from the reactors (L25a, L25b, L25c) and discharging the energy from itself.

Such a boosting operation (i.e., the power factor correction operation) by the power factor corrector (25) is described, with reference to a boost converter for one phase as an example. First, when the switching device (Q25a) turns on, a current path is formed in the order of the power source line (41), the reactor (L25a), the switching device (Q25a), the resistor (R25a), and the GND line (42). The PFC current (Ipfc) flows in this order. Next, the PFC current (Ipfc) flows into the reactor (L25a) such that the reactor (L25a) is charged with the energy. Then, when the switching device (Q25a) turns off, the current path is cut off by the switching device (Q25a). Accordingly, a current equivalent to the amount of the energy stored into the reactor (L25a) flows through the diode (D25a) into the smoothing capacitor (26). As a result, the voltage across the smoothing capacitor (26) increases.

Note that the boost converters for the other two phases are connected in parallel to the boost converter for the one phase, and the operations of the former converters are similar to the operation of the latter converter.

The number of the constituent elements such as the reactors (L25a, L25b, L25c) in the power factor corrector (25) is an example, and shall not be limited as described above. Moreover, instead of the resistors (R25a, R25b, R25c), a not-shown current sensor may detect the PFC currents (Ipfc).

—Output Voltage Detector—

The output voltage detector (27) detects the output voltage (V2).

As illustrated in FIGS. 1 and 3, the output voltage detector (27) mainly includes: two resistors (27a, 27b) connected in series to each other; and the controller (31) functioning as an output voltage sampler (31c). The two resistors (27a, 27b) are provided between the power factor corrector (25) and the power converter (28), and connected across the smoothing capacitor (26) A voltage (V21) at a connecting point between the resistors (27a, 27b) is input into the controller (31), sampled and converted from analogue to digital by the output voltage sampler (31c) for an output detection period, and identified by the output voltage detector (27) as the result of the detection (Vdc) of the output voltage (V2).

The output detection period is shorter than the input detection period that is a period of detection by the input voltage detector (24). For example, the output detection period may be approximately 10 msec when the input detection period is approximately 1 sec.

—Power Converter—

The power converter (28) is connected to an output of the power factor corrector (25) in parallel to the reactors (L25a, L25*b*, L25*c*). When receiving the output voltage (V2) from the power factor corrector (25), the power converter (28) generates the output AC power (SU, SV, SW).

The power converter (28) includes an inverter circuit and an inverter driver neither of which is shown. The inverter circuit includes, for example, two or more of the following: power devices each of which is an insulated gate bipolar transistor; and freewheeling diodes each connected in inverse-parallel to a corresponding one of the power devices. The inverter driver is, for example, an integrated circuit, and connected to a gate terminal of each power device. Based on a motor control signal (Pwm) to be output from the controller (31), the inverter driver controls the application of a gate voltage to each power device to turn on and off the power device, and causes the inverter circuit to generate the output AC power (SU, SV, SW).

—Current Detector—

The current detector (29) detects a value of an input current (Im) flowing to the power factor corrector (25). The input current (Im) flows from the commercial power source (91) through the power source line (41), and the power converter (28), into the motor (11). The input current (Im) then flows again to the power converter (28), through the GND line (42), into the power factor corrector (25).

As illustrated in FIGS. 1 and 3, the current detector (29) mainly includes, for example, a shunt resistor (29*a*) connected in series on the GND line (42), and the controller (31) functioning as an input current calculator (31*d*). A voltage (Vd2) across the shunt resistor (29*a*) is input into the controller (31), and sampled and converted from analogue to digital by the input current calculator (31*d*) for a predetermined sampling period. The voltage (Vd2) is used for the calculation of the input current (Im).

—Power Factor Correction Driver—

The power factor correction driver (30) is connected to the controller (31) and the gate terminals of the switching devices (Q25*a*, Q25*b*, Q25*c*). The power factor correction driver (30) is, for example, an integrated circuit. Based on the PFC drive instruction signal (Cpfc) from the controller (31), the power factor correction driver (30) controls the application of a gate voltage to each of the switching devices (Q25*a*, Q25*b*, Q25*c*) to turn on and off the power factor corrector (25).

Specifically, when turning on the power factor corrector (25) for the power factor correction operation, the power factor correction driver (30) outputs gate control signals (G1, G2, G3) to the respective switching devices (Q25*a*, Q25*b*,Q25*c*) so that the gate control signals (G1, G2, G3) repeatedly turn on and off the switching devices (Q25*a*, Q25*b*, Q25*c*) in a short period. To the contrary, when turning off the power factor corrector (25) so that the power factor correction operation stops, the power factor correction driver (30) outputs gate control signals (G1, G2, G3) to the respective switching devices (Q25*a*,Q25*b*,Q25*c*) so that the gate control signals (G1, G2, G3) leave all the switching devices (Q25*a*,Q25*b*,Q25*c*) off.

—Controller—

The controller (31) includes a memory and a central processing unit (CPU). Depending on various programs stored in the memory, the controller (31) functions as the above units as illustrated in FIG. 3: namely, the input voltage sampler (31*a*), the PFC current calculator (31*b*); the output voltage sampler (31*c*); and the input current calculator (31*d*). Moreover, the controller (31) functions as a motor driving controller (31*e*).

The motor driving controller (31*e*) determines the motor control signal (Pwm) based on rotor position information on the motor (11), and outputs the determined motor control signal (Pwm) to the inverter driver of the power converter (28). The rotor position information includes, for example, the result of detection by the hall effect sensor in the motor (11), and the input current (Im) that is the result of detection by the current detector (29). Moreover, while the motor (11) is driving, the motor driving controller (31*e*) performs feedback control on the drive of the motor (11) using, for example, the rotor position information and a result of detection at a moment (Vac_peak, Vdc) by each of the detectors (24, 27).

Furthermore, the controller (31) according to this first embodiment performs control for the power factor corrector (25). The control includes: on-off control of the power factor corrector (25) when the motor (11) is running at a regular speed; variable control of the output target value (Vdc_ref) indicating a target value of the output voltage (Vdc) to be output by the power factor corrector (25); and on-off control, of the power factor corrector (25), associated with the occurrence of instantaneous voltage drop or instantaneous power failure.

The on-off control of the power factor corrector (25) performed when the motor (11) is running at a regular speed involves turning on and off the power factor corrector (25), based on, for example, the input current (Im), when neither instantaneous voltage drop nor instantaneous power failure occurs. In the control, for example, the power factor corrector (25) turns on when the input current (Im) exceeds a first threshold value, and turns off when the input current (Im) falls below a second threshold value which is below the first threshold value. Instead of the control technique based on the input current (Im), the following control techniques may be adopted: a control technique based on the level of output power from the power factor corrector (25); and a control technique to turn on the power factor corrector (25) as soon as the motor (11) starts.

Described in detail below are the variable control of the output target value (Vdc_ref) and the on-off control, of the power factor corrector (25), associated with instantaneous voltage drop or instantaneous power failure.

Variable Control of Output Target Value

This control is performed by the controller (31) functioning as a target value determiner (31*f*).

Figure 4:
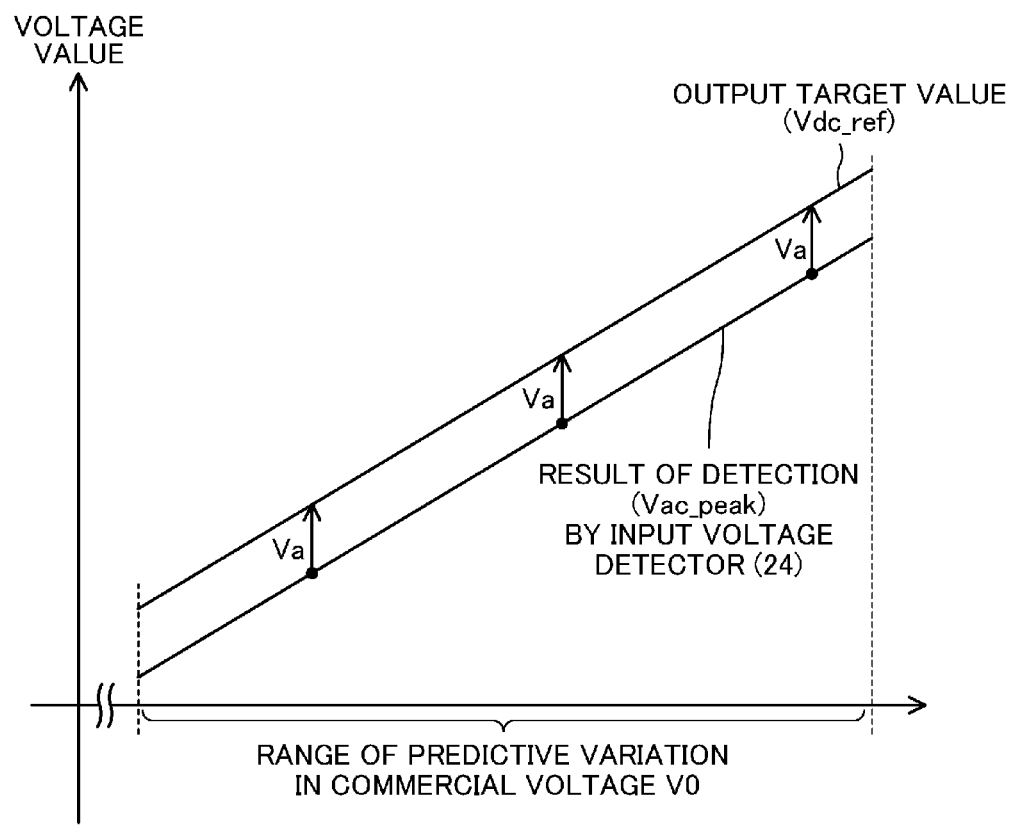
FIG. 4 is a graph conceptually illustrating a variable output target value according to the first embodiment.

FIG. 4 conceptually illustrates the variable output target value (Vdc_ref) according to this first embodiment. In FIG. 4, the abscissa represents the range of a predictive variation in the commercial voltage (V0), and the ordinate represents (i) a result of detection (Vac_peak) by the input voltage detector (24) for each commercial voltage (V0) and (ii) an output target value (Vdc_ref). As illustrated in FIG. 4 and represented by Expression (1) below, the target value determiner (31*f*) determines, as the output target value (Vdc_ref), the result of adding a constant boost amount (Va) to a result of detection at a moment (Vac_peak) by the input voltage detector (24).

$$Vdc\_ref = Vac\_peak + Va \quad (1)$$

In other words, FIG. 4 and Expression (1) show that even if the input voltage (V1) to the power factor corrector (25) varies, the output target value (Vdc_ref) is not always maintained at a certain value, and the output voltage (Vdc) from the power factor corrector (25) varies depending on the input voltage (V1). Specifically, FIG. 4 illustrates that as the commercial voltage (V0) becomes lower, the result of detection (Vac_peak) by the input voltage detector (24)

shifts toward a lower voltage, and the resulting output target value (Vdc_ref) becomes smaller. To the contrary, as the commercial voltage (V0) becomes higher, the result of detection (Vac_peak) by the input voltage detector (24) shifts toward a higher voltage, and the resulting output target value (Vdc_ref) becomes greater. Such variable control of the output target value (Vdc_ref) is beneficial when the commercial voltage (V0) varies; that is, when "power supply voltage variation" occurs.

The power supply voltage variation is caused by various reasons. One of such reasons is that when various appliances simultaneously operate, using the commercial power source (91) as a power source, the load on the capacity of the commercial power source (91) exceeds a regular load. In such a case, excessive currents flow from the commercial power source (91) to each of the appliances, and the commercial power source (91) cannot withstand the influence of the excessive currents. Hence, the commercial voltage (V0) drops from its reference value. Another reason is that when most of the appliances are not operating, the load is lower than the regular load, and thus the commercial voltage (V0) rises higher than the reference value.

Such power supply voltage variation could occur on a temporary basis as well as on a permanent basis.

When the power supply voltage variation occurs, the result of detection (Vac_peak) by the input voltage detector (24) also varies. For example, when the commercial voltage (V0) becomes lower with respect to the reference value if the output voltage (V2) from the power factor corrector (25) is constant regardless of the presence or absence of the power supply voltage variation, the boost amount of power factor corrector (25) increases compared with the case when the commercial voltage (V0) is the reference value. Then, the amount of energy to be stored in the reactors (L25a, L25b, L25c) of the power factor corrector (25) increases, and naturally so does the amount of currents flowing into the reactors (L25a, L25b, L25c) and the switching devices (Q25a, Q25b, Q25c). As a result, the power loss of the reactors (L25a, L25b, L25c) and the switching devices (Q25a, Q25b, Q25c) increases.

Then, as represented by Expression (1) and illustrated in FIG. 4, the target value determiner (310 performs control which involves maintaining the boost amount (Va) of the power factor corrector (25) constant, and determining the output target value (Vdc_ref) based on the result of detection (Vac_peak) by the input voltage detector (24). Hence, the boost amount (Va) itself remains unchanged even if the power supply voltage variation occurs, such that the currents flowing through the switching devices (Q25a, Q25b, Q25C) remain approximately constant. Consequently, the power loss of the reactors (L25a, L25b, L25c) and the switching devices (Q25a, Q25b, Q25c), included in the power factor corrector (25), also remains approximately constant.

On-Off Control by Power Factor Corrector Associated with Instantaneous Voltage Drop and Instantaneous Power Failure This control is carried out by the controller (31) functioning as an instantaneous power failure controller (31g) equivalent to a controller.

In the above power supply voltage variation, temporarily occurring variation includes so-called instantaneous voltage drop and instantaneous power failure. Caused by, for example, lightning, the instantaneous voltage drop is instantaneous drop of the commercial voltage (V0). Caused by, for example, lightning, the instantaneous power failure is instantaneous cut-off of the supply of the commercial voltage (V0) to the power converter (20). The instantaneous drop or the instantaneous power failure of the commercial voltage (V0) lasts, for example, from 10 msec to 100 msec.

For the sake of explanation, the instantaneous voltage drop and instantaneous power failure are hereinafter collectively referred to as "instantaneous power interference".

Studied here is a case when an instantaneous power interference occurs in the commercial power source (91) while the power factor corrector (25) is performing the power factor correction operation. Here, even though the power factor corrector (25) is performing the power factor correction operation, the output voltage (V2) from the power factor corrector (25) decreases with a decrease in the input voltage (V1) to the power factor corrector (25). In the instantaneous power interference, the commercial voltage (V0) drops or the power supply stops for a very short period, as described above, such that the commercial power source (91) recovers in, for example, 10 msec to 100 msec. Here, the power factor corrector (25) boosts the input voltage (V1) while the output voltage (V2) from the power factor corrector (25) itself has not reached the output target value (Vdc_ref). The resulting output voltage (V2) might transitionally surge. Then, an excessive current flows through the switching devices (Q25a, Q25b, Q25c) of the power factor corrector (25) to generate heat, possibly causing the breakdown (i.e., so-called transient heat breakdown) of the switching devices (Q25a, Q25b, Q25c). The selection of the switching devices (Q25a, Q25b, Q25c) could be made in view of the excessive current; however, the selected switching devices (Q25a, Q25b, Q25c) tend to be large in size, which would inevitably increase their costs.

As illustrated in FIG. 5, if determining the occurrence of an instantaneous power interference in the commercial power source (91) (section B) while the power factor corrector (25) is performing the power factor correction operation (section A), the instantaneous power failure controller (31g) according to this first embodiment turns the switching devices (Q25a, Q25b, Q25c) off so that the power factor correction operation stops (section C). In particular, as illustrated in the section C, the instantaneous power failure controller (31g) leaves the power factor correction operation by the power factor corrector (25) stopped when the commercial power source (91) recovers.

Here, FIG. 5 is a timing diagram illustrating temporal changes in: the input voltage (V1); results of detection (Vac_peak, Vdc) by the input voltage detector (24) and the output voltage detector (27); permission and prohibition of a power factor correction operation by the power factor corrector (25); PFC drive instruction signal (Cpfc); output state of the power factor correction driver (30); PFC current (Ipfc); and output AC power (SU, SV, SW).

Specifically, since the instantaneous power interference does not occur in the section A of FIG. 5, the results of detection (Vac_peak, Vdc) by the input voltage detector (24) and the output voltage detector (27) remain constant in general. In the section A, the controller (31) outputs the PFC drive instruction signal (Cpfc) to drive the power factor corrector (25). Based on the gate control signals (G1, G2, G3) from the power factor correction driver (30), the power factor corrector (25) performs the power factor correction operation. Hence, the PFC currents (Ipfc) flow through the switching devices (Q25a, Q25b, Q25c). Moreover, the power converter (28) outputs the output AC power (SU, SV, SW), which drives the motor (11). Thus, the compressor (72)

drives, and the air conditioner (70) performs air conditioning operation including, for example, cooling operation and heating operation.

The instantaneous power interference occurs when the section A transits to the section B in FIG. 5. Here, in the section B, an operation is performed to determine the presence or absence of the instantaneous power interference.

Described here is how to detect the instantaneous power interference with reference to FIG. 6. FIG. 6 illustrates a condition table (Ta1) organizing details of controls to be performed mainly by the instantaneous power failure controller (31g). The condition table (Ta1) in FIG. 6 associates operation names (Ta11), operation conditions (Ta12), and operation details (Ta13) with one another.

As an operation condition (Ta12) having a record number "1" in FIG. 6 shows, the instantaneous power failure controller (31g) subtracts the result of the detection (Vdc) by the output voltage detector (27) from the output target value (Vdc_ref) determined based on Expression (1), in order to calculate a difference between a result of the detection (Vdc) at a moment by the output voltage detector (27) and the output target value (Vdc_ref). As represented by Expression (2) below, if the difference is larger than a predetermined difference (DIF), the instantaneous power failure controller (31g) determines the occurrence of the instantaneous power interference:

$$DIF < Vdc\_ref - Vdc \qquad (2)$$

where the predetermined difference (DIF) is appropriately determined based on, for example, the reference value of the commercial voltage (V0), and capacitances of the smoothing capacitor (26) and the switching devices (Q25a, Q25b, Q25c).

In this case, furthermore, a condition—the result of the detection (Vdc) by the output voltage detector (27) is greater than a predetermined lower limit (LVP)—may be satisfied (Vdc>LVP) so that the instantaneous power failure controller (31g) may reliably determine that the power failure is not a common power failure but the instantaneous power interference. In the common failure, the result of the detection (Vdc) by the output voltage detector (27) remains to be lower for a while than the predetermined lower limit (LVP), and the output voltage (V2) from the power factor corrector (25) becomes sufficiently low during the power failure. Hence, even though the power factor correction operation is started immediately when the commercial power source (91) recovers, a phenomenon in which the output voltage (V2) from the power factor corrector (25) surges does not occur.

Moreover, in this first embodiment, the condition—the input detection period of the input voltage detector (24) is longer than the output detection period of the output voltage detector (27)—is satisfied as described above. This is to reliably determine whether the instantaneous power interference has occurred. Specifically, even though the peak amplitude (V11) of the input voltage (V1) actually instantaneously drops due to the occurrence of the instantaneous power interference, a phenomenon occurs to show that the result of detection (Vac_peak) itself by the input voltage detector (24) does not drop to the degree that the occurrence of the instantaneous power interference is determined, because the input detection period is longer than the output detection period. Meanwhile, the result of the detection (Vdc) by the output voltage detector (27) drops almost as low as the actual output voltage (V2). When the instantaneous power interference occurs, in contrast to the case when the instantaneous power failure does not occur, the difference between the output target value (Vdc_ref) and the result of the detection (Vdc) by the output voltage detector (27) is greater than or equal to the predetermined difference (DIF). Here, the output target value (Vdc_ref) is the sum of the result of detection (Vac_peak) by the input voltage detector (24) and the boost amount (Va). As a result, the instantaneous power interference controller (31g) may reliably determine the instantaneous power interference while performing the variable control of the output target value (Vdc_ref).

Note that whether or not the condition for the predetermined difference (DIF) is satisfied, if the result of the detection (Vdc) by the output voltage detector (27) is smaller than the predetermined lower limit (LVP) (Vdc<LVP) as an operation condition (Ta 12) having a record number "2" in FIG. 6 shows, the instantaneous power failure controller (31g) determines that the output voltage (V2) is short. Here, the main power source relay (23) in FIG. 1 is opened, and the power converter (28) stops supplying the output AC power (SU, SV, SW) to the motor (11). Consequently, the compressor (72) stops driving, and the air conditioner (70) stops the air conditioning operation. Here, for example, on the display screen of a remote controller (not shown) for the air conditioner (70), a message appears to indicate the abnormality of the output voltage (V2).

After determining the occurrence of the instantaneous power interference in the section B in FIG. 5, the instantaneous power failure controller (31g) then, in the section C, switches (i) the state of the power factor correction operation performed by the power factor corrector (25) from "permitted" to "prohibited", and (ii) the PFC drive instruction signal (Cpfc) from "drive" to "stop". The power factor correction driver (30) then stops outputting the gate control signals (G1, G2, G3) to the power factor corrector (25), and the switching devices (Q25a, Q25b, Q25c) of the power factor corrector (25) turn off. The current paths in the switching devices (Q25a, Q25b, Q25c) are cut off, and the PFC currents (Ipfc) stop flowing. As a result, the power factor correction operation stops as shown in an operation detail (Ta13) having the record number "1" in FIG. 6.

Note that, in the section C, only the power factor corrector (25) turns off. The compressor (72) does not stop and continues driving since the output AC power (SU, SV, SW) is supplied to the motor (11). Here, the input voltage (V1) enters the power converter (28) without being boosted by the power factor corrector (25).

Suppose, in the section C, the instantaneous power interference has been overcome and the commercial power source (91) has recovered. As an operation condition (Ta12) having a record number "3" in FIG. 6 shows, the instantaneous power failure controller (31g) determines the recovery of the commercial power source (91) if the following conditions are satisfied: the result of the detection (Vdc) by the output voltage detector (27) is greater than the predetermined lower limit (LVP) (Vdc>LVP); and approximately 100 msec have passed since the occurrence of the instantaneous power interference. When the commercial power source (91) recovers, the instantaneous power failure controller (31g) monitors whether the compressor (72) is driving normally in accordance with the drive of the motor (11) as shown in an operation detail (Ta13) having the record number "3" in FIG. 6. The instantaneous power failure controller (31g) then starts measuring, from the recovery of the commercial power source (91), a time period in which the compressor (72) is driving normally.

When the section C transits to the section D, suppose the time period being measured has reached a predetermined time period as shown in an operation condition (Ta12)

having a record number "4" in FIG. 6. Here, as shown in the section D in FIG. 5 and an operation detail (Ta13) having the record number "4" in FIG. 6, the instantaneous power failure controller (31g) switches the state of the power factor correction operation performed by the power factor corrector (25) from "prohibited" to "permitted". Then, immediately after switching the state of the power factor correction operation to "permitted", the instantaneous power failure controller (31g) determines whether to actually perform the power factor correction operation, depending on, for example, the input current (Im). If determining to perform the power factor correction operation, the instantaneous power failure controller (31g) switches the PFC drive instruction signals (Cpfc) from "stop" to "drive". Thus, the power factor correction driver (30) resumes outputting the gate control signals (01, G2, G3), and the switching devices (Q25a, Q25b, Q25c) repeat on and off. Consequently, the switching devices (Q25a, Q25b, Q25c) start conducting the PFC currents (Ipfc), followed by the start of the power factor correction operation. The compressor (72) continues driving also in the section D.

Note that if an abnormality is observed in the drive of the motor (11) from the recovery of the commercial power source (91) through the predetermined time period, the controller (31) may turn off the main power source relay (23) to stop the drive of the motor (11). Here, the "abnormality" includes overcurrent of the motor (11), for example.

The predetermined time period is beneficially set shorter than a time interval from the recovery of the commercial power source (91) to the start of ripple-drop control. The ripple-drop control involves reducing ripple components of the voltage across the smoothing capacitor (26).

When the instantaneous power interference occurs in this first embodiment, the power factor corrector (25) temporarily turns off to suspend the power factor correction operation. During the suspension, the input voltage (V1), which is not boosted, is applied to the smoothing capacitor (26). Despite the suspension of the power factor correction operation, the instantaneous power interference, which lasts for a very short period, allows the load (i.e., the driving motor (11)) on the power converter (28) to remain relatively unvaried before and after the power factor correction operation. As a result, depending on the level of the load, there may be an increase in the ripple components of the voltage across the smoothing capacitor (26), causing the reduction in the lifetime of the smoothing capacitor (26). When the ripple components increase, however, the controller (31) performs control in, for example, 30 sec after the recovery of the commercial power source (91) to, for example, decrease the speed of the motor (11) so as to drop the ripple components (i.e., the ripple-drop control), thereby reducing the load. However, the ripple-drop control would also cause decline in driving performance of the compressor (72), inevitably resulting in decline in performance of the air conditioner (70). Thus, when the commercial power source (91) recovers in this first embodiment, the power factor corrector (25) is turned on to resume the power factor correction operation before the start of the ripple-drop control. This successfully minimizes decline in the air conditioning performance.

Note that the predetermined time period may take a fixed value, as well as a variable value determined depending on the period and degree of the instantaneous power interference.

Note that, as an example, FIG. 5 illustrates a case in which there is a difference in timing between (i) when the state of the power factor correction operation switches from "prohibited" to "permitted" and (ii) when the power factor correction operation actually resumes. This shows that switching of the state from "prohibited" to "permitted" does not immediately start the power factor correction operation. Hence, if the condition has already been right for the power factor correction operation to be actually carried out when the state of the power factor correction operation switches from "prohibited" to "permitted", the instantaneous power failure controller (31g) may immediately turn on the power factor corrector (25).

Effects of First Embodiment

In the power converter (20) according to this first embodiment, the switching devices (Q25a, Q25b, Q25c) in the boost power factor corrector (25) turn off when the instantaneous power interference occurs, and the power factor correction operation—the boosting operation—is suspended. When the commercial power source (91) recovers, the power factor correction operation is suspended. Hence, in the power factor corrector (25), the current paths including the switching devices (Q25a, Q25b, Q25c) are cut off. The cut-off of the current paths limits a temporal surge of the output voltage (V2) from the power factor corrector (25), due to the power factor correction operation performed when the commercial power source (91) recovers, and reduces an excessive amount of current flowing in the switching devices (Q25a,Q25b,Q25c). Such features enable curbing malfunctions of the switching devices (Q25a,Q25b, Q25c), contributing to reduction of the switching devices (Q25a,Q25b,Q25c) in size and cost.

Furthermore, in the power converter (20) according to this first embodiment, the instantaneous power failure controller (31g) may determine the occurrence of the instantaneous power interference if the difference between the output target value (Vdc_ref) and the result of the detection (Vdc) by the output voltage detector (27) is greater than the predetermined difference (DIF). Such a feature allows the instantaneous power failure controller (31g) to easily determine whether the instantaneous power interference has occurred.

Moreover, when the instantaneous power interference occurs, both the actual input voltage (V1) and output voltage (V2) decrease. Meanwhile, in this first embodiment, the input detection period is longer than the output detection period. If the instantaneous power interference has occurred, the result of detection (Vac_peak) by the input voltage detector (24) is higher in value than the result of the detection (Vdc) by the output voltage detector (27). Thus, the difference between the output target value (Vdc_ref) and the result of the detection (Vdc) by the output voltage detector (27) is greater than the predetermined difference (DIF). Here, the output target value (Vdc_ref) is the sum of the result of detection (Vac_peak) by the input voltage detector (24) and the boost amount (Va). As a result, the instantaneous power failure controller (31g) may reliably determine the instantaneous power interference even when performing the variable control on the output target value (Vdc_ref).

Furthermore, in this first embodiment, the power factor corrector (25) turns off when the instantaneous power interference occurs; however, the compressor (72) continues driving. Such a feature allows a user to stay comfortable in a room air-conditioned by the air conditioner (70).

Moreover, in this first embodiment, the power factor corrector (25) may resume the power factor correction operation when the compressor (72) is driving normally.

In addition, in this first embodiment, the power factor corrector (25) is permitted to perform power factor correction between the recovery of the commercial power source (91) and the start of the ripple-drop control. Such features minimize a decline in performance, of the air conditioner (70), due to the ripple-drop control.

Modified Example 1 of First Embodiment

As FIG. 4 and Expression (1) show, the output target value (Vdc_ref) of the power factor corrector (25) is determined by the sum of the result of detection (Vac_peak) by the input voltage detector (24) and the constant boost amount (Va).

However, the output target value (Vdc_ref) may vary depending on the result of detection (Vac_peak) by the input voltage detector (24). The instantaneous power failure controller (31g) may determine the output target value (Vdc_ref) based on a technique other than those obtained through FIG. 4 and Expression (1).

Modified Example 2 of First Embodiment

The input voltage detector (24) may also sample, instead of the peak amplitude (V11) of the input voltage (V1), values such as an effective value and an average value of the commercial voltage (V0) or the input voltage (V1), based on the input detection period.

In the above statements, the input detection period is longer than the output detection period; however, the input detection period does not have to be longer than the output detection period if the instantaneous power interference is successfully detected without difficulty.

Second Embodiment

This second embodiment describes a case when the output target value (Vdc_ref) is a fixed value. Described below are features different only from those in the first embodiment.

How to Determine Output Target Value

Figure 7:
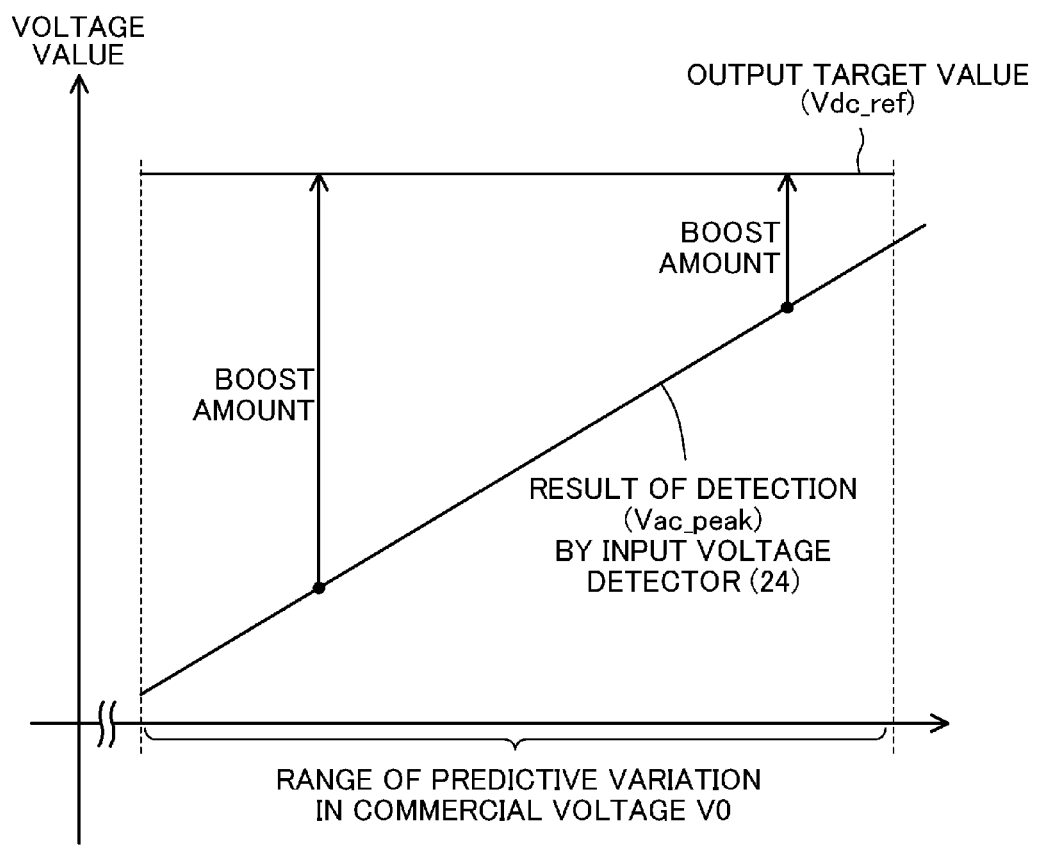
FIG. 7 is a graph conceptually illustrating a fixed output target value according to a second embodiment.
Figure 8:
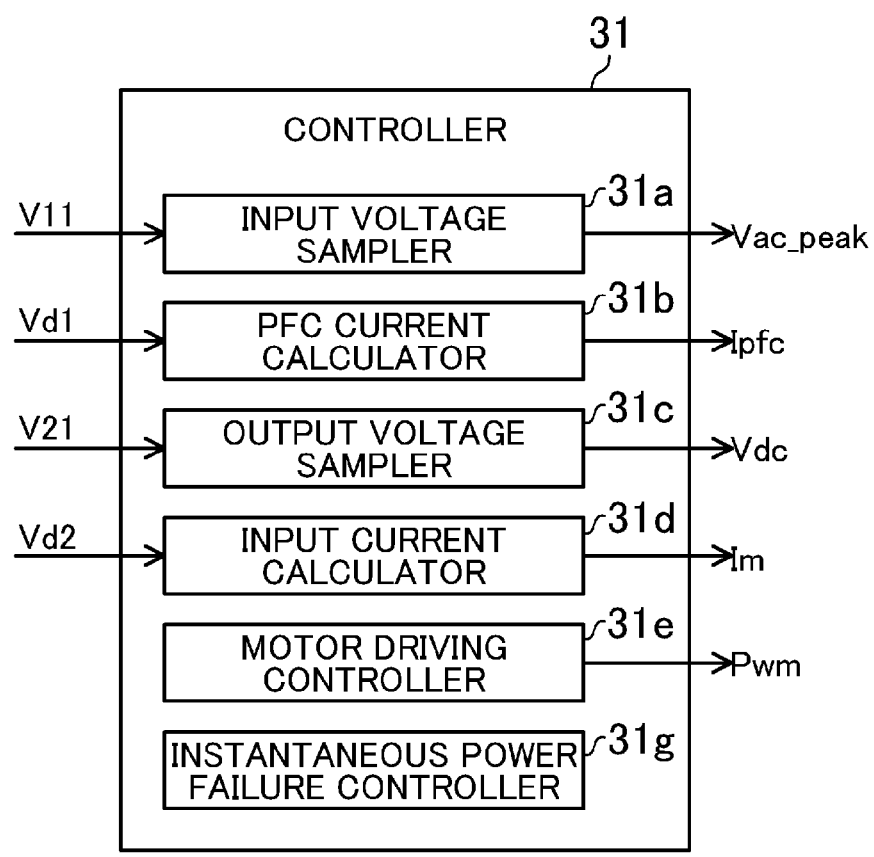
FIG. 8 is a schematic diagram illustrating functional units of a controller according to the second embodiment.

FIG. 7 is a graph conceptually illustrating a fixed output target value (Vdc_ref) according to this second embodiment. In FIG. 7, the abscissa represents the range of a predictive variation in the commercial voltage (V0), and the ordinate represents (i) a result of detection (Vac_peak) by the input voltage detector (24) for a commercial voltage (V0) and (ii) an output target value (Vdc_ref). FIG. 8 is a schematic diagram illustrating functional units of the controller (31) according to the second embodiment.

As illustrated in FIG. 7, the output target value (Vdc_ref) is previously fixed constant, regardless of the result of detection (Vac_peak) by the input voltage detector (24). As an example, FIG. 8 illustrates a case when the controller (31) does not function as the target value determiner (31f) in the first embodiment.

The output target value (Vdc_ref) according to this second embodiment is determined based on the state of the commercial power source (91) under an environment in which the air conditioner (70) is installed. In particular, considering circumstances (specifically, for example, power supply voltage variation) of the countries in which the air conditioner (70) is probably installed, the output target value (Vdc_ref) is preferably determined to be higher than the peak amplitude (V11) of the input voltage (V1) based on the commercial voltage (V0) of any commercial power source (91). This is because if a reversal occurs—the peak amplitude (V11) of the input voltage (V1) becomes higher than the output target value (Vdc_ref)—the power factor corrector (25) stops boosting the input voltage (V1) such that the power factor becomes lower.

On-Off Control by Power Factor Corrector Associated with Occurrence of Instantaneous Voltage Drop and Instantaneous Power Failure Similar to the first embodiment, when detecting instantaneous power interference including instantaneous voltage drop and instantaneous power failure while the power factor corrector (25) is performing a power factor correction operation, the instantaneous power failure controller (31g) turns the switching devices (Q25a, Q25b, Q25c) off so that the power factor correction operation stops. When the commercial power source (91) recovers, the power factor correction operation by the power factor corrector (25) is also suspended.

How to detect the instantaneous power interference and the detailed operations of the instantaneous power failure controller (31g) are similar to those described in the first embodiment, and the description thereof shall be omitted.

Note that, in the first embodiment, the condition—the input detection period is longer than the output detection period—is satisfied so that the variable control on the output target value (Vdc_ref) is achieved. The condition may be included as a condition for detecting the instantaneous power interference also in this second embodiment in which the output target value (Vdc_ref) is a fixed value. This is because the occurrence of the instantaneous power interference is successfully detected without problems.

Effects of Second Embodiment

In the power converter (20) according to this second embodiment, as well as the first embodiment, the switching devices (Q25a,Q25b,Q25c) in the boost power factor corrector (25) turn off when the instantaneous power interference occurs and the commercial power source (91) recovers, and the power factor correction operation—the boosting operation—is suspended. Hence, in the power factor corrector (25), the current paths including the switching devices (Q25a, Q25b, Q25c) are cut off. Even though the output target value (Vdc_ref) is fixed, the cut-off of the current paths limits a temporal surge of the output voltage (V2), from the power factor corrector (25), due to the power factor correction operation performed when the commercial power source (91) recovers, and reduces an excessive amount of current flowing in the switching devices (Q25a, Q25b, Q25c). Such features enable curbing malfunctions of the switching devices (Q25a, Q25b, Q25c).

Modification of Second Embodiment

The power converter (20) according to the second embodiment may include either the input voltage detector (24) or the output voltage detector (27). Here, the operation condition (Ta12) having the record number "1" in FIG. 6 is changed.

If the power converter (20) includes the input voltage detector (24), the input voltage detector (24) samples the value of the input voltage (V1) at a shorter period (e.g., 10 msec each) than the input detection period according to the first embodiment, and obtains the sampled value as the result of detection. If the power converter (20) includes the output voltage detector (27), the output voltage detector (27) samples the value of the output voltage (V2) at a period (e.g., 10 msec each) similar to the output detection period according to the first embodiment, and obtains the sampled value as the result of detection. Here, the instantaneous power interference controller (31g) may determine whether the instantaneous power interference has occurred and the commercial power source (91) has recovered, depending on how large or small the result of detection by the input voltage detector (24) or the output voltage detector (27) is.

Other Embodiments

The first and second embodiments may include the configurations below.

The parameter to be used for detecting the instantaneous power interference does not have to be limited to the results of detection by the input voltage detector (24) and the output voltage detector (27). Any parameter and detection technique may be adopted as long as the instantaneous power interference can be detected. Other parameters include the PFC current (Ipfc) and the input current (Im).

When the instantaneous power interference occurs, the compressor (72) may also stop driving.

The condition in which the power factor correction operation is permitted for the power factor corrector (25) may be a condition other than the case when the compressor (72) continues driving from the recovery of the commercial power source (91) through the predetermined time period. For example, the power factor correction operation may be permitted when the PFC current (Ipfc) or the input current (Im) exceeds a predetermined value after the recovery of the commercial power source (91).

Moreover, the predetermined time period does not have to be shorter than the time interval observed until the start of the ripple-drop control. The predetermined time period may be set longer than the time interval.

If the air conditioner (70) (i.e., more specifically, the compressor (72)) is driving under overload when the instantaneous voltage interference occurs, the stop of the power factor corrector (25) decreases an input power factor. As a result, an excessive amount of current inevitably flows into the rectifier (22) and the main power source relay (23). In such a case, the ripple-drop control may be performed almost simultaneously with the turn-off control of the power factor corrector (25) in order to protect, for example, the rectifier (22). Such a feature limits the performance of the compressor (72) even though the power factor correction operation stops, which contributes to curbing the flow of the excessive amount of current into, for example, the rectifier (22). Note that the overload condition of the compressor (72) is when the load (e.g., the rotation speed of the motor (11)) exceeds the reference value. The reference value includes, for example, the maximum value of the load (e.g., the rotation speed of the motor (11)) on which the compressor (72) can normally drive with respect to the voltage, across the smoothing capacitor (26), observed when the power factor corrector (25) stops.

Furthermore, the motor (11) may also drive other units, such as the outdoor fan (76) and the indoor fan (82), than the compressor (72).

Moreover, a separate rectifying circuit from the rectifier (22) may be connected to the commercial power source (91) and the input voltage detector (24) may detect the output voltage from the rectifying circuit.

INDUSTRIAL APPLICABILITY

As can be seen, the present invention is useful for a power converter including a boost power factor corrector, and an air conditioner equipped with the power converter.

DESCRIPTION OF REFERENCE CHARACTERS

20 Power Converter
22 Rectifier
24 Input Voltage Detector
25 Power Factor Corrector
26 Smoothing Capacitor
L25a, L25b, L25c Reactor
Q25a, Q25b, Q25c Switching Device
27 Output Voltage Detector
28 Power Converter
31g Instantaneous Power Failure Controller (Controller)
70 Air Conditioner
70 Compressor
72 Commercial Power Source (AC Power Source)
V1 Input Voltage
V11 Peak Amplitude
V2 Output Voltage
Vac_peak Result of Detection by Input Voltage Detector
Vdc Result of Detection by Output Voltage Detector
Vdc_ref Output Target Value (Target Value of Output Voltage)
DIF Predetermined Difference

The invention claimed is:

1. A power converter comprising:
a rectifier configured to rectify an input alternate current from an AC power source;
a power factor corrector including a reactor and a switching device which switches between accumulation and discharge of energy, based on an input voltage output from the rectifier, in and out of the reactor, and configured to be capable of performing a power factor correction operation by boosting the input voltage;
an input voltage detector configured to periodically detect the input voltage;
an output voltage detector configured to periodically detect an output voltage from the power factor corrector;
a power converter connected to an output of the power factor corrector, and configured to generate output AC power; and
a controller configured to control the power factor correction operation by the power factor corrector, wherein
the controller is configured to:
determine a target value of the output voltage to be output by the power factor corrector, based on a result of detection by the input voltage detector;
determine occurrence of an instantaneous voltage drop or an instantaneous power failure if a difference between the target value of the output voltage and a result of the detection by the output voltage detector is greater than a predetermined difference;
turn the switching device off so that the power factor correction operation stops, if the instantaneous voltage drop or the instantaneous power failure occurs in the AC power source while the power factor corrector is performing the power factor correction operation; and
leave the power factor correction operation stopped when the AC power source recovers, and a detection period whereby the input voltage detector periodically detects the input voltage is longer than a detection period whereby the output voltage detector periodically detects the output voltage from the power factor corrector, such that the instantaneous voltage drop or the instantaneous power failure causes a smaller drop in the result of detection by the input voltage detector than the result of detection by the output voltage detector.

2. The power converter of claim 1, wherein
the input voltage detector is configured to sample a peak amplitude of the input voltage, and determine the sampled peak amplitude as the result of detection.

3. An air conditioner including the power converter of claim 1.

4. The air conditioner of claim 3, further comprising
a compressor configured to compress a refrigerant, wherein
the switching device and the power converter are connected in parallel to the reactor, and
the controller is configured to leave the compressor driving without rest, if the instantaneous voltage drop or the instantaneous power failure occurs while the compressor is driving.

5. The air conditioner of claim 4, wherein
the controller is configured to permit the power factor corrector to perform the power factor correction operation, if the compressor continues driving from recovery of the AC power source through a predetermined time period.

6. The air conditioner of claim 5, wherein
the power factor corrector further includes a smoothing capacitor provided close to an output of the reactor, and connected in parallel to the switching device, and
the predetermined time period is shorter than a time interval from the recovery of the AC power source to a start of control to drop a ripple component of a voltage across the smoothing capacitor.

7. The air conditioner of claim 3, wherein
the power factor corrector further includes a smoothing capacitor provided close to an output of the reactor, and connected in parallel to the switching device, and
the controller is configured to cause the power factor correction operation to stop and a ripple component of the voltage across the smoothing capacitor to drop, if the instantaneous voltage drop or the instantaneous power failure occurs while the compressor is driving under overload.

8. An air conditioner including the power converter of claim 2.

9. The air conditioner of claim 8, further comprising
a compressor configured to compress a refrigerant, wherein
the switching device and the power converter are connected in parallel to the reactor, and
the controller is configured to leave the compressor driving without rest, if the instantaneous voltage drop or the instantaneous power failure occurs while the compressor is driving.

10. The air conditioner of claim 9, wherein
the controller is configured to permit the power factor corrector to perform the power factor correction operation, if the compressor continues driving from recovery of the AC power source through a predetermined time period.

11. The air conditioner of claim 10, wherein
the power factor corrector further includes a smoothing capacitor provided close to an output of the reactor, and connected in parallel to the switching device, and
the predetermined time period is shorter than a time interval from the recovery of the AC power source to a start of control to drop a ripple component of a voltage across the smoothing capacitor.

12. The air conditioner of claim 8, wherein
the power factor corrector further includes a smoothing capacitor provided close to an output of the reactor, and connected in parallel to the switching device, and
the controller is configured to cause the power factor correction operation to stop and a ripple component of the voltage across the smoothing capacitor to drop, if the instantaneous voltage drop or the instantaneous power failure occurs while the compressor is driving under overload.

* * * * *